June 5, 1934. H. R. SILVER 1,961,174
MOUNTING BRAKE SUPPORT ON SQUARE TRAILER AXLES
Original Filed May 31, 1932
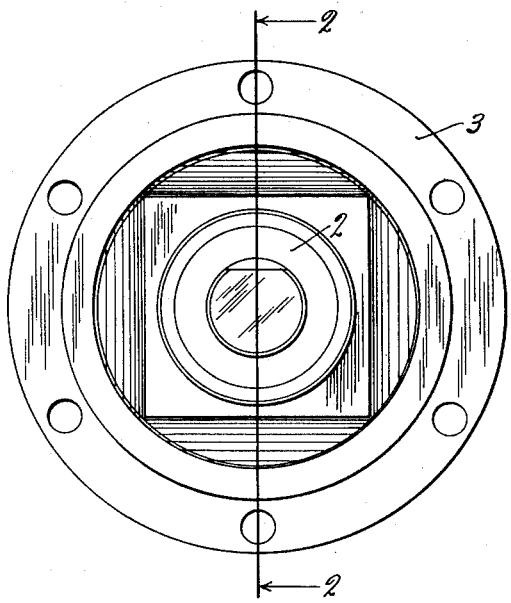
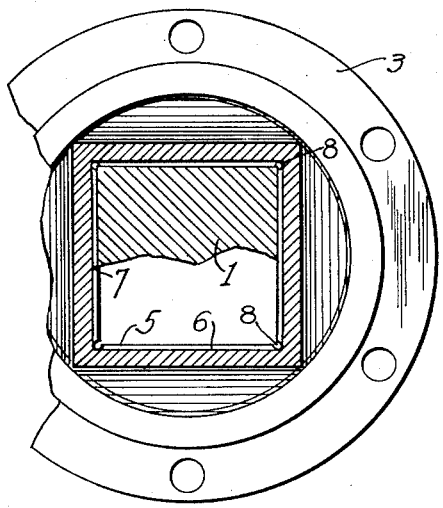
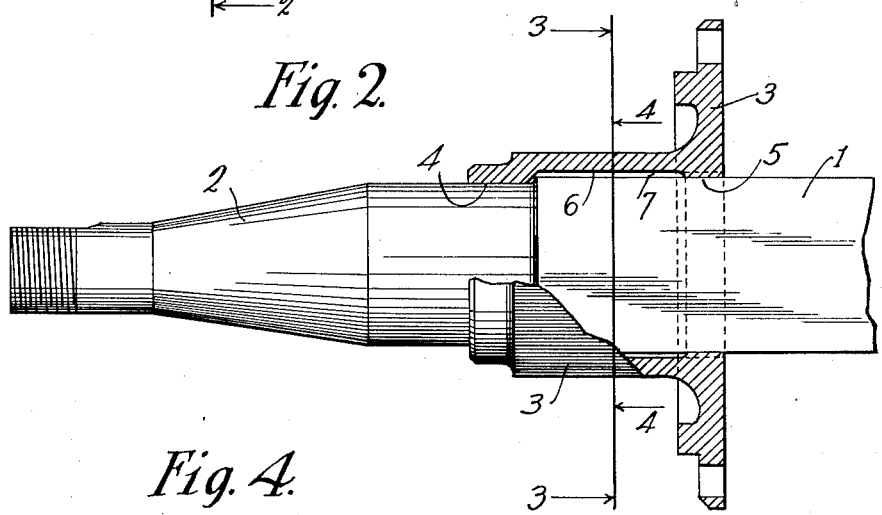
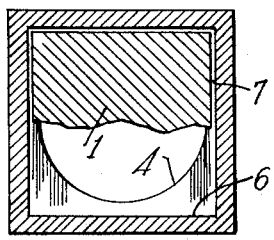
Inventor
Herbert R. Silver
By Arthur J. Robert
Attorney Patented June 5, 1934

1,961,174

UNITED STATES PATENT OFFICE 1,961,174

MOUNTING BRAKE SUPPORT ON SQUARE TRAILER AXLES

Herbert R. Silver, Louisville, Ky.

Application May 31, 1932, Serial No. 614,331
Renewed November 4, 1933

3 Claims. (Cl. 188—206)

In the manufacture of trailers, the brake supports must be rigidly mounted on the axles. In connection with rectangular or square axles it has been proposed heretofore to obtain the desired rigidity by forcing the parts together. Since the axle is usually composed of rolled steel and the braking support of some ductile material such as cast steel, malleable iron or brass, which is cast in the form, these parts not only have a rough, uneven surface but, in addition, vary in dimensions, although identically produced. Consequently, it has been the practice to machine these parts to provide uniform dimensions and surface conditions which would permit them to be forced together and cause them to fit so tightly and uniformly as to produce the desired rigidity. To avoid the expense of machining, it has also been proposed to weld the parts when loosely fitted together or make the brake support in two pieces, bolting it together around the axle. Of these modes the first mentioned is perhaps the more desirable, because it combines unchanging or constant rigidity with removability, whereas the welded structure is not removable, while the bolted structure is apt to become loose from time to time.

The present invention is directed to an arrangement of the first type mentioned and proposes an improvement whereby the expense entailed therein is substantially reduced without effecting the rigidity or the removability. This is accomplished by forcing the parts together without machining them. I have discovered that the majority of variations in dimensions uniformly occur within certain limits, that substantially all of these variations can be held within these limits without special care and that within these variations and despite the roughness of their surfaces, the parts can be forced together, without creating undue strain, into a fit equally as rigid and desirable as that obtained when the parts are machined.

The invention is illustrated in the accompanying drawing wherein:

Figure 1 is an end elevation of the brake support on a square axle;

Figure 2 is a section partly in elevation along line 2—2 of Figure 1; and

Figures 3 and 4 are sections along lines 3—3 and 4—4 respectively of Figure 2 with one-half of the axle broken away.

In carrying out my invention I provide an axle 1, preferably of square or other suitable rectangular shape, which is composed of some suitable metal such as rolled steel and provided with a rounded end portion 2 of the usual shape. The brake support or hub 3 is also composed of any suitable ductile metal which is cast into the form shown. This hub is cast with the usual square bore extending from one end of the hub toward the other end where it terminates in a round bore. The wall surface defining the bore consists of a round axle-engaging portion 4 at one end, a square axle-engaging portion 5 at the other end, and an intermediate or connecting square portion 6, the bore of which is made larger than the bore at 5 so as to provide, when parts are fitted together, a clearance 7 between the hub and the axle. The cross dimensions of the portion 6 may, if desired, be made the same as that of 5. I have determined, however, that the desired rigidity can be obtained when the clearance 7 is provided, and, therefore, prefer having this clearance inasmuch as the pressure otherwise required to force the parts together would be greater.

As stated previously the dimensions of the axle and hub vary within certain limits. For example an axle which is intended to be 2¾" square will ordinarily vary from $\frac{3}{32}$ of an inch under the intended dimensions to $\frac{1}{16}$ of an inch over the intended dimensions. The cross dimensions of the square bore of the hub is ordinarily intended to be $\frac{1}{16}$ of an inch smaller than the corresponding dimensions of the axle, and consequently, for a 2¾" axle the dimensions of the bore are intended to be $2\frac{11}{16}$" square. This, however, is subject to variations from $\frac{3}{32}$ of an inch under to nothing over the intended dimensions. To facilitate a comparison of these dimensions they are given in the following table with the fractions all reduced to thirty-seconds:

|  | Small | Dimensions intended | Large |
|---|---|---|---|
| Axle | 22$\frac{3}{32}$ | 22$\frac{1}{32}$ | 22$\frac{6}{32}$ |
| Hub bore | 22$\frac{1}{32}$ | 22$\frac{3}{32}$ | 22$\frac{7}{32}$ |

It will be noted that with these variations occuring, the bore will vary from $\frac{1}{32}$ to $\frac{5}{32}$ of an inch smaller in cross dimensions than the axle. It is easily possible with ordinary care to maintain the variations in dimensions within the limits noted, but it should be understood that it is necessary only to maintain the variations of the bore within the limits ranging from zero to $\frac{5}{32}$ of an inch smaller than the axle.

With the parts unmachined and varying within the limits last mentioned rigid securement of the hub will result without undue strain when the parts are forced together. The forcing of the hub upon the axle can be carried out by any suitable means (not shown) and without the application of heat.

Naturally there will be some strain centered around the corners of the parts as a result of their difference in dimensions, and this strain will increase as their difference in dimensions increase. While the strain created within the limits noted will not be unduly large, it is possible to relieve it somewhat by cutting away the corners of the axle-engaging bore-portion 5 as indicated at 8. Of course, the same result could be obtained by cutting off the corresponding corners of the axle.

Having described my invention I claim:

1. In a trailer, a combination with a square axle of an integral hub mounted on said axle, said hub having a square bore-portion, and an axle-engaging, unmachined surface within said portion, one original cross dimension of which is not substantially greater than $\frac{5}{32}$ of an inch smaller than the original corresponding dimension of said axle.

2. In a trailer, the combination with a square axle, an integral hub mounted on said axle, said hub having a square bore-portion and said axle having within said portion an unmachined, hub-engaging surface, one original cross dimension of which is not substantially more than $\frac{5}{32}$ of an inch larger than the original corresponding dimension of said bore portion.

3. In a trailer, a combination with a square axle of an integral hub mounted on said axle, said hub having a square bore-portion, and said parts having within said portion unmachined, mutually-engaging surfaces, the original cross dimensions of the axle-engaging surfaces of the bore being not substantially greater than $\frac{5}{32}$ of an inch smaller than the original corresponding dimensions of said axle.

HERBERT R. SILVER.